UNITED STATES PATENT OFFICE.

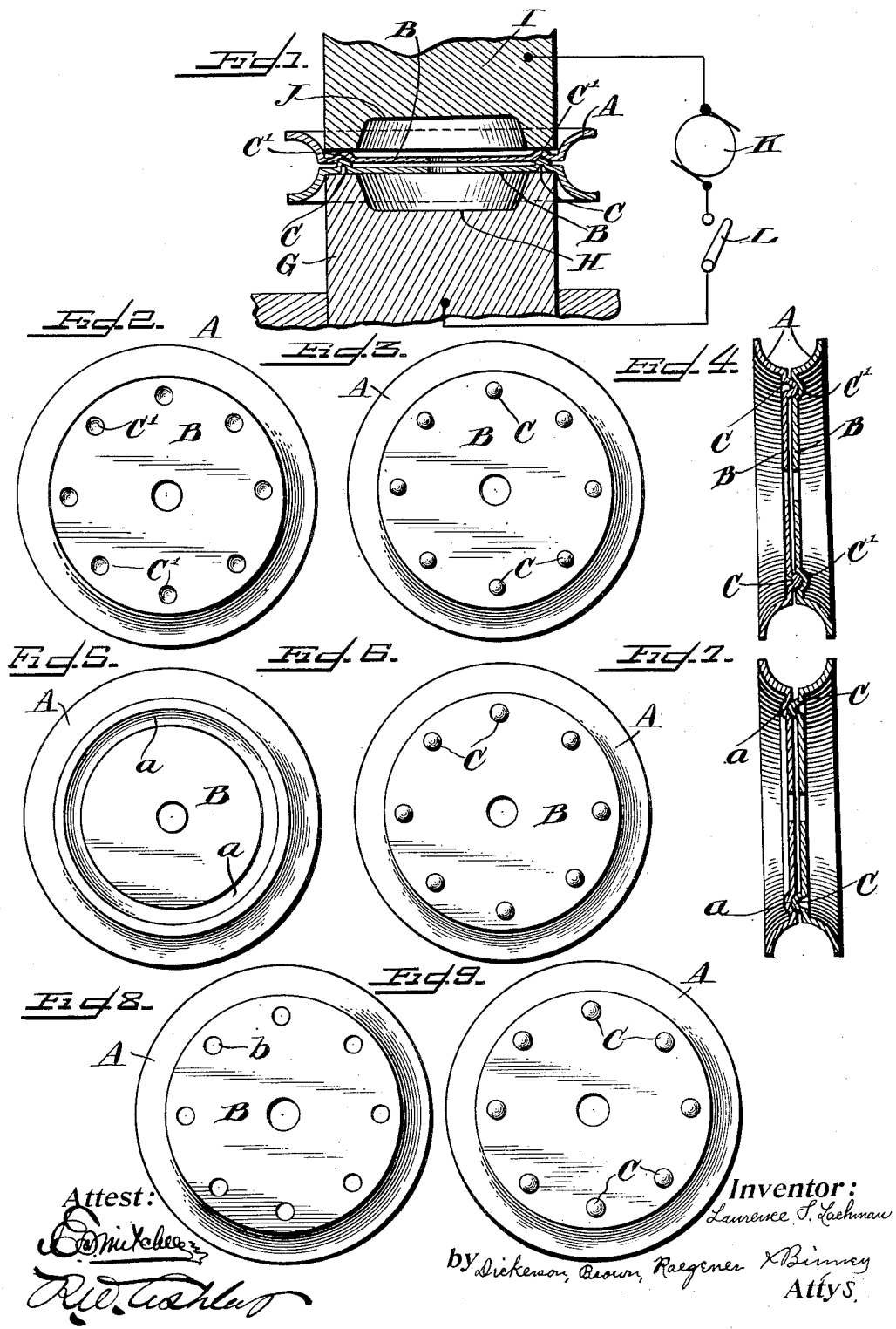

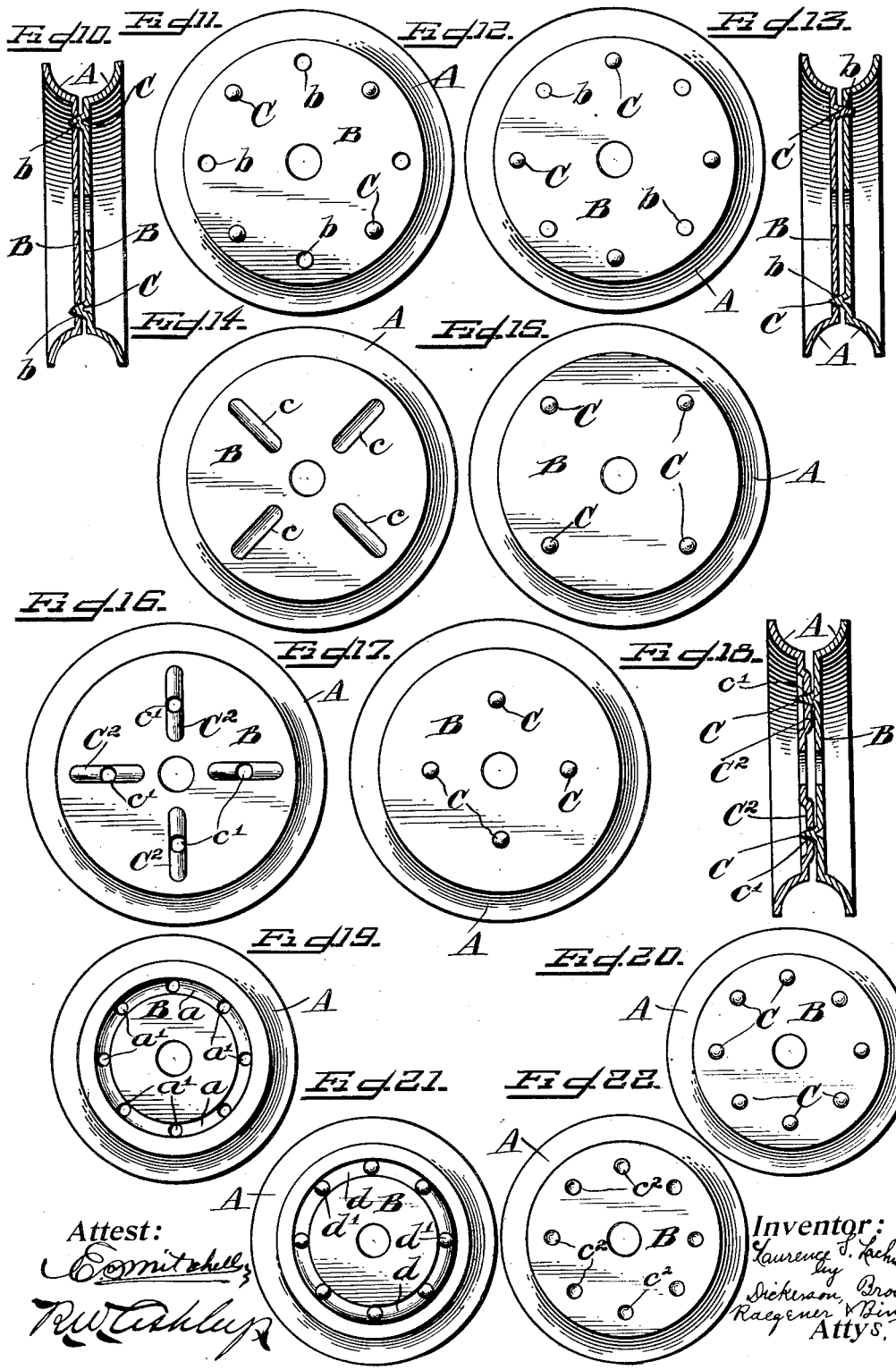

LAURENCE S. LACHMAN, OF NEW YORK, N. Y.

PROCESS OF ELECTRIC WELDING.

No. 828,033.　　　　Specification of Letters Patent.　　　　Patented Aug. 7, 1906.

Application filed July 28, 1905. Serial No. 271,616.

*To all whom it may concern:*

Be it known that I, LAURENCE S. LACHMAN, a citizen of the United States, and a resident of the borough of Manhattan, city, county, and State of New York, have invented certain new and useful Improvements in Processes of Electric Welding, of which the following is a specification.

The invention relates to an improved process of electric welding for welding two sheets of metal together.

The invention may be applied to the construction of pulleys, wheels, sheaves, pulley-frames, and other structures whereby the parts of the structures may be securely united to each other without the use of rivets, bolts, keys, and without interlocking connections.

While I have specified certain named devices to which the invention relates and to which the process is particularly applicable, I am nevertheless not to be understood as limiting this invention to such devices, because the process may be used in any connection to which it is applicable.

Further objects of the invention will hereinafter appear; and to these ends the invention consists of the process of electric welding for carrying out the above objects embodying the steps hereinafter fully described and claimed in this specification.

Suitable apparatus for carrying out the process is illustrated in the accompanying drawings, in which—

Figure 1 is a vertical sectional view of a suitable die or press and the parts of a sheet-metal wheel or pulley which are to be welded together electrically. Figs. 2 and 3 are inside face views of the parts of the wheel or pulley to be welded together. Fig. 4 is a vertical sectional view of the parts of the pulley arranged in juxtaposition. Figs. 5 and 6 are inside face views of a wheel or pulley which may be welded together, and Fig. 7 is a vertical sectional view of said parts arranged opposite each other. Figs. 8 and 9 are inside face views of the coöperating portions of a wheel or pulley to be welded together, and Fig. 10 is a vertical sectional view of the same arranged opposite each other. Figs. 11 and 12 are inside face views of the halves of a pulley, and Fig. 13 is a vertical sectional view. Figs. 14 and 15 are inside face views of another form of the pulley. Figs. 16 and 17 are inside face views of one form of the pulley, and Fig. 18 is a vertical sectional view of the two halves arranged opposite each other. Figs. 19 and 20 are inside face views of one form of the pulley, and Figs. 21 and 22 are inside face views of another form.

According to this improved process two sheet-metal portions of the final product are welded to each other electrically, whether the two sheet-metal portions referred to form the parts of a pulley or wheel, the different parts of a frame or tool or utensil, or other sheet-metal structure.

In the drawings I have illustrated the process as applied to welding together the two coöperating portions of a sheet-metal wheel or pulley, although other devices might have been shown to illustrate the process. Each half of the pulley is provided with a flanged portion A and body portion B of any desired form, which may be pressed out of sheet-metal.

In welding the two portions of the wheel together in any of the forms illustrated in the drawings projecting points of contact are provided upon one portion of the wheel and sockets, depressions, or even apertures may be provided on the other portion of the wheel and adapted to coöperate with the projecting points, whereby the metal at the projecting points and at the sockets or holes is melted electrically, and thus the parts are securely welded together.

In Figs. 2, 3, and 4 one half of the wheel is provided with projections C and the other half with depressions or sockets C', which projections and sockets may be formed in any desired manner—as, for instance, by being forced or pressed from the body portion B. The projections or sockets C and C' may also be formed of cuts or slits or pieces of metal punched from the body portion. One portion of the metal is laid upon the other portion, as illustrated in Fig. 1, with the projection C lying in the socket C' and in contact therewith, as shown in Figs. 1 and 4—that is to say, the projections C at one portion of the wheel bear directly upon the sockets or depressions of the other portion, and thus the two parts of the wheel are properly centered. Obviously alternating sockets and projections C and C' may be provided on each half of the wheel (shown in Figs. 2 and 3) instead of having all of the projections on one half and all of the sockets on the other half. The construction may also be described as a wheel comprising sheet-metal parts and having projections on each part facing in the same direction—that is to say, projections inwardly from the inner face of one half, as the projection C, and projections outwardly from the outer face of the other half of the wheel, in which case the sockets C' would be called "projections," although I prefer to call them "sockets" or "depressions."

G represents the bed of a die or press, the die portion of which is hollowed at H to receive one half of the wheel. The punch I is also hollowed out at J to receive the upper half of the wheel; but the outer portions of the die and punch are adapted to bear upon those portions of the body of the wheel directly in the rear of the flanges A and over the projections C.

By way of illustration the die and punch are shown with diagrammatic electric circuits connected to a suitable source of supply or generator K, having a controlling-switch L. The parts of the wheel are first laid on the die H and then the punch I is brought down, whereupon the electric circuit will be completed as soon as the punch comes in contact with the upper half of the wheel. It will be seen that the circuit is completed through the projections C and through the sockets C', which sockets and projections are in contact with each other, while the sockets C', which are formed by the metal which projects beyond the outer face of the wheel are in contact with the punch I of the die or press. With a current of the proper strength the projections and socket portions of the wheel will be fused to weld the two portions of the wheel together. A higher resistance of course is encountered to the path of the current at the poor contact formed between the sockets C' and the punch I of the die. The pressure of the punch I is continuously applied as the metal fuses, thereby forcing the two parts of the wheel together, and as soon as the welding is complete the current is switched off. Suitable contacts may be provided on the parts of the press which will automatically complete an electric circuit for breaking the circuit at the switch L at the proper time.

Many modifications of the process may be carried out—that is to say, the projections may be made to coöperate with many different kinds of holes, depressions, or sockets—as, for instance, in Figs. 5, 6, and 7 the projections C are provided upon one portion of the wheel, while a continuous circular depression $a$ is formed upon the other half of the wheel on the inside surface of the same, so that the projections C may be placed within the continuous circular depression $a$, as shown in Fig. 7.

In Figs. 8 and 9 one half of the wheel is provided with apertures or holes $b$, through which the projections C project, as indicated in Fig. 10, in such manner that when the wheel is laid in the press the projection C will bear upon the bed portion G and in contact therewith. Upon passing a current through the sheet-metal portions of the wheel the projections C and the edges of the holes $b$ are fused and the projections are flattened and form a button on the outside of the wheel, but of a character so smooth that it can barely be seen with the naked eye.

In Figs. 11 and 12 the holes or apertures $b$ on the portions of the wheel are arranged to alternate with the projections C. In this case also the projections C are of sufficient length to extend through the apertures $b$ and make contact with the bed G of the press and with the punch I.

In Figs. 14 and 15 radial depressions $c$ are formed in one half of the wheel, with projections C on the other half adapted to lie in the depressions $c$ when the halves of the wheel are arranged opposite each other. The depressions $c$ and projections C may also be alternately arranged on each half of the wheel.

In Figs. 16 and 17 a further modification is shown, in which the projections $C^2$ on one half of the wheel are provided with apertures $c'$, through which the projections C on the other half of the wheel are adapted to project, as indicated in Fig. 18. In this case also the projections C are of sufficient length to come in contact with the bed G of the press. It is obvious that the modification illustrated in Figs. 14 and 15 may have apertures $c'$ provided in the depressions $c$, through which the projections C on the other half of the wheel may be thrust.

In the modification illustrated in Figs. 19 and 20 the circular depression $a$ is provided with apertures $a'$, through which the projections C are thrust. If desired, instead of a circular depression $a$ a circular rib projecting from the inner face of the wheel may be provided with apertures $a'$ therein adapted to coöperate with the projections C on the other half of the wheel.

In Figs. 21 and 22 the projecting circular rib $d$ is provided with projections $d'$, adapted to coöperate with depressions $c^2$ on the other half of the wheel. For the depression $c^2$ apertures may be also provided, and the alternating arrangement may also be substituted, as described in connection with the other figures.

In all of the modifications of the process described the two parts of the wheel are placed in the press and the operation is carried out as described in connection with Figs. 2, 3, and 4.

I do not herein claim the processes of electric welding by means of points or projections disclosed and claimed in my copending applications, Serial No. 233,109, filed November 17, 1904, and Serial No. 251,712, filed March 24, 1905.

I claim, and desire to obtain by Letters Patent, the following:

1. The process of electrically welding one piece of sheet metal to another, which consists in providing projecting portions upon one of said sheets of metal and depressed portions on the other of said sheets of metal, placing one sheet of metal upon the other with the projecting portions of one in contact with the depressed portions of the other, passing a current of electricity through said sheets of metal and through said coöperating projections and depressions, thereby fusing said portions, and simultaneously forcing the two sheets of metal together to securely weld one to the other.

2. The process of electrically welding one piece of sheet metal to another, which consists in providing projecting portions upon one of said sheets, and providing coöperating socket portions on the other sheet, into which the projections may be thrust, passing a current of electricity through said sheets of metal and contacting portions, thereby fusing the metal of the projections and sockets, and simultaneously forcing the two sheets of metal together to securely weld one to the other.

3. The process of electrically welding one piece of sheet metal to another, one sheet having a multiplicity of projections and the other having coöperating sockets adapted to receive said projections, which consists in placing one sheet of metal upon the other with the projections coöperating with the sockets on the other sheet, passing a current of electricity through said sheets of metal and coöperating contacting portions, thereby fusing said portions and simultaneously forcing the two sheets of metal together to securely weld one to the other.

4. The process of electrically welding two pieces of sheet metal which are provided with coöperating projections which consists in placing the two sheets of metal together with the projections in contact with the socket portions, placing the two said sheets in a suitable press, completing an electric circuit through said press and the sheets of metal and simultaneously forcing the two sheets together, thereby fusing the contacting portions and securely welding the sheets one to the other.

5. The process of electrically welding two pieces of sheet metal together, said sheets being provided with coöperating projections and apertures, said projections being of sufficient length to pass through the apertures which consists in placing said sheets together, one upon the other, with the projections thrust through the apertures, and placing the two said sheets in a suitable press with the projections in contact with one portion of the press, passing a current of electricity through said sheets of metal and simultaneously forcing the two sheets together, thereby fusing the contacts and securely welding the two parts together.

In testimony whereof I have signed this specification in the presence of two subscribing witnesses.

LAURENCE S. LACHMAN.

Witnesses:
OLIN A. FOSTER,
A. L. O'BRIEN.